US012686139B2

(12) United States Patent
Koenen

(10) Patent No.: US 12,686,139 B2
(45) Date of Patent: Jul. 21, 2026

(54) SEALING AN OPENING THROUGH WHICH A DRIVE SHAFT EXTENDS IN A SHAVING UNIT FOR A ROTARY ELECTRIC SHAVER

(71) Applicant: KONINKLIJKE PHILIPS N.V., Eindhoven (NL)

(72) Inventor: Maurits Koenen, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/281,143

(22) PCT Filed: Dec. 19, 2022

(86) PCT No.: PCT/EP2022/086549
§ 371 (c)(1),
(2) Date: Sep. 8, 2023

(87) PCT Pub. No.: WO2023/138856
PCT Pub. Date: Jul. 27, 2023

(65) Prior Publication Data

US 2024/0157589 A1 May 16, 2024

(30) Foreign Application Priority Data

Jan. 21, 2022 (EP) .................................... 22152699

(51) Int. Cl.
*B26B 19/38* (2006.01)
*B26B 19/14* (2006.01)

(52) U.S. Cl.
CPC .......... *B26B 19/3866* (2013.01); *B26B 19/14* (2013.01); *B26B 19/386* (2013.01)

(58) Field of Classification Search
CPC . B26B 19/386; B26B 19/3866; B26B 19/148; B26B 19/14–18; B26B 19/22;
(Continued)

(56) References Cited

U.S. PATENT DOCUMENTS 3,369,294 A 2/1968 Shaw
4,363,169 A * 12/1982 Nasu ...................... B26B 19/14
30/41

(Continued)

FOREIGN PATENT DOCUMENTS

CN 212421374 U 6/2020
CN 113021424 A 6/2021

(Continued)

OTHER PUBLICATIONS

International Search Report and Written Opinion of PCT/EP2022/086549, dated Mar. 30, 2023.

*Primary Examiner* — Evan H Macfarlane

(57) ABSTRACT

In a hair-cutting unit (6) of a shaving unit (3), a supporting member (30) surrounding and supporting an external cutting member (10) is present, and further a holder (40) mounted to the supporting member (30) is present. A base portion (7) of the shaving unit (3) comprises a hair-collecting chamber (50), a drive shaft (60) extending through an opening (71) in a bottom portion (70) of the base portion (7), and a first shielding member (72) surrounding this bottom opening (71). The holder (40) comprises a second shielding member (42) surrounding an opening (41) in the holder (40), wherein, in a coupled condition of the hair-cutting unit (6) and the base portion (7), the first shielding member (72) and the second shielding member (42) together surround the drive shaft (60) and thereby seal the bottom opening (71) relative to the hair-collecting chamber (50).

10 Claims, 6 Drawing Sheets

(58) Field of Classification Search

CPC ....... B26B 19/24; B26B 19/26; B26B 19/265; B26B 19/28; B26B 19/286; B26B 19/30; B26B 19/32; B26B 19/34; B26B 19/36; B26B 19/382

See application file for complete search history.

(56) References Cited

U.S. PATENT DOCUMENTS

| | | | | |
|---|---|---|---|---|
| 4,393,169 | A * | 7/1983 | Moriwaki | C08F 285/00 525/902 |
| 4,475,285 | A | 10/1984 | Hara | |
| 10,654,182 | B2 * | 5/2020 | Meijer | B26B 19/14 |
| 2004/0221454 | A1 | 11/2004 | Miyasaka | |
| 2006/0156550 | A1 | 7/2006 | Beugels | |
| 2009/0320295 | A1 * | 12/2009 | Shimizu | B26B 19/145 30/43.6 |
| 2019/0337171 | A1 | 11/2019 | Lap | |
| 2022/0048211 | A1 * | 2/2022 | Eijkelkamp | B26B 21/4056 |
| 2023/0020301 | A1 | 1/2023 | Devries | |

FOREIGN PATENT DOCUMENTS

| | | | | |
|---|---|---|---|---|
| EP | 0318103 | A1 | 5/1989 | |
| GB | 2047154 | A | 11/1980 | |
| WO | 2011055323 | A1 | 5/2011 | |
| WO | 2018138302 | A1 | 8/2018 | |
| WO | WO-2018138063 | A1 * | 8/2018 | B26B 19/14 |

* cited by examiner

SEALING AN OPENING THROUGH WHICH A DRIVE SHAFT EXTENDS IN A SHAVING UNIT FOR A ROTARY ELECTRIC SHAVER

CROSS-REFERENCE TO PRIOR APPLICATIONS

This application is the U.S. National Phase application under 35 U.S.C. § 371 of International Application No. PCT/EP2022/086549, filed on Dec. 19, 2022, which claims the benefit of European Patent Application No. 22152699.9, filed on Jan. 21, 2022. These applications are hereby incorporated by reference herein.

FIELD OF THE INVENTION

The invention relates to a shaving unit for a rotary electric shaver, comprising a base portion and a hair-cutting unit which is releasably coupled to the base portion, wherein:

- the hair-cutting unit comprises an external cutting member with hair-entry openings, an internal cutting member which is covered by and rotatable relative to the external cutting member about a central axis of the hair-cutting unit, a supporting member surrounding and supporting the external cutting member, and a holder mounted to the supporting member for keeping the external cutting member and the internal cutting member in an operational position in the supporting member;
- the base portion comprises a hair-collecting chamber and a drive shaft extending through an opening in a bottom portion of the base portion;
- in a coupled condition of the hair-cutting unit and the base portion, the drive shaft extends through an opening in the holder and engages the internal cutting member for driving the internal cutting member into rotation about the central axis; and
- in a decoupled condition of the hair-cutting unit and the base portion, the hair-collecting chamber is accessible for a user of the shaving unit.

The invention further relates to an electric shaver comprising a main body and a shaving unit as mentioned here before, wherein:

- the main body accommodates an electric motor;
- the base portion of the shaving unit is connected to the main body; and
- the drive shaft of the base portion of the shaving unit is coupled to an output shaft of the electric motor.

BACKGROUND OF THE INVENTION

The invention is in the field of shavers, particularly rotary electric shavers which are designed to perform a shaving action in which hairs protruding from the skin, such as beard hairs, are cut at a position close to the skin. In general, an electric shaver comprises a shaving unit where one or more hair-cutting units are located, and further comprises a main body. A particularly common design of the shaving unit uses three hair-cutting units in an equilateral triangular configuration. Designs of the shaving unit using more or less hair-cutting units are known as well. The main body is normally shaped so as to be suitable to be taken hold of by a user of the electric shaver and may accommodate various components of the shaver including an electric motor. The main body and the shaving unit are connected to each other, usually in releasable fashion.

A hair-cutting unit comprises a combination of an internal cutting member which is arranged so as to rotate during operation and an external cutting member which is arranged to cover the internal cutting member, wherein the external cutting member is provided with hair-entry openings for allowing hairs to protrude into the interior of the external cutting member and encounter the internal cutting member during a shaving action. In a practical design, the external cutting member is generally cup-shaped and has a substantially circular periphery. The hair-entry openings may be shaped like elongated slits extending substantially radially with respect to a central axis of the hair-cutting unit, and/or like circular holes, in one or more annular areas making up one or more hair-cutting tracks. The external cutting member is held in a supporting member, and a holder mounted to the supporting member is provided for keeping the external cutting member and the internal cutting member in an operational position in the supporting member.

Proper use of the electric shaver involves putting the shaver to an active state, i.e. a state in which the internal cutting member of the hair-cutting unit of the shaving unit is rotated, and moving the shaving unit over a portion of skin to be subjected to a shaving action. The external cutting member has a hair-cutting track surface for contacting a portion of skin at the position of the one or more hair-cutting tracks during a hair-cutting action. At positions where the hair-entry openings are delimited, hair-cutting surfaces are present in the external cutting member. In a common design, the internal cutting member comprises a carrier and a plurality of hair-cutting elements arranged annularly on the carrier, wherein the hair-cutting elements comprise blades having hair-cutting edges. During a shaving action, hairs entering the hair-entry openings are sheared between the hair-cutting surfaces of the external cutting member and the hair-cutting edges of the internal cutting member, and get cut off at a position close to the skin as a result thereof.

In the shaving unit, space is present for receiving and storing cut hairs and other shaving debris. In particular, the shaving unit comprises a base portion, and the base portion comprises a hair-collecting chamber. It is advantageous to have a configuration of the shaving unit in which the hair-cutting unit is releasably coupled to the base portion, so that a user is enabled to set a decoupled condition of the hair-cutting unit and the base portion and to thereby gain access to the hair-collecting chamber for purposes of emptying and cleaning the hair-collecting chamber. The base portion also comprises a drive shaft extending through an opening in a bottom portion of the base portion. In a coupled condition of the hair-cutting unit and the base portion, the drive shaft extends through an opening in the holder and engages the internal cutting member for driving the internal cutting member into rotation about the central axis. In order to prevent cut hairs and other shaving debris from moving from the hair-collecting chamber into an interior space of the main body accommodating the electric motor and probably also other electric parts of the shaver, through the opening in the bottom portion of the base portion, a sealing component such as a sealing gasket is used in said opening for sealing the gap between the drive shaft and the material of the bottom portion of the base portion delimiting said opening, at least in shaving units intended for use in middle end and high end electric shavers. In shaving units intended for use in low end electric shavers, such a sealing component may be omitted in order to save costs, as a result of which proper functioning of the electric shavers is at risk and the lifetime of the electric shavers may turn out to be short.

SUMMARY OF THE INVENTION

It is an object of the invention to provide a way of reducing complexity and costs of an electric shaver without compromising quality. In view thereof, the invention provides a shaving unit for a rotary electric shaver, which is of the type as described here before, namely of the type comprising a base portion and a hair-cutting unit which is releasably coupled to the base portion, wherein:

the hair-cutting unit comprises an external cutting member with hair-entry openings, an internal cutting member which is covered by and rotatable relative to the external cutting member about a central axis of the hair-cutting unit, a supporting member surrounding and supporting the external cutting member, and a holder mounted to the supporting member for keeping the external cutting member and the internal cutting member in an operational position in the supporting member;

the base portion comprises a hair-collecting chamber and a drive shaft extending through an opening in a bottom portion of the base portion;

in a coupled condition of the hair-cutting unit and the base portion, the drive shaft extends through an opening in the holder and engages the internal cutting member for driving the internal cutting member into rotation about the central axis; and in a decoupled condition of the hair-cutting unit and the base portion, the hair-collecting chamber is accessible for a user of the shaving unit.

According to the invention, in the shaving unit:

the base portion comprises a first shielding member integrally formed with the bottom portion of the base portion and surrounding the opening in the bottom portion of the base portion;

the holder comprises a second shielding member integrally formed with the holder and surrounding the opening in the holder; and in the coupled condition of the hair-cutting unit and the base portion, an upper rim of the first shielding member and a lower rim of the second shielding member mutually engage such that the first shielding member and the second shielding member together surround the drive shaft and thereby seal the opening in the bottom portion of the base portion relative to the hair-collecting chamber.

It follows from the foregoing that the invention involves making clever use of the presence of the holder besides the base portion, and further involves modifying the design of both the holder and the base portion, and that this is done in such a way that the shaving unit is provided with the functionality of blocking material from the hair-collecting chamber from moving through the opening in the bottom portion of the base portion, without a need for a sealing component in said opening. The fact is that by providing the base portion with a first shielding member surrounding the opening in the bottom portion of the base portion and providing the holder with a second shielding member surrounding the opening in the holder, and by making a suitable combination of the first shielding member and the second shielding member, it is achieved that the opening in the bottom portion of the base portion is sealed relative to the hair-collecting chamber. The respective shielding members are particularly designed such that in the coupled condition of the hair-cutting unit and the base portion, an upper rim of the first shielding member and a lower rim of the second shielding member mutually engage such that the first shielding member and the second shielding member together surround the drive shaft, so that the drive shaft and the opening in the bottom portion of the base portion through which the drive shaft extends cannot be reached from the hair-collecting chamber. In view of the fact that the first shielding member is an integral portion of the base portion and that the second shielding member is an integral portion of the holder, the sealing functionality is achieved in the shaving unit without applying one or more separate sealing components, so that the number of separate components from which the shaving unit is assembled can be kept to a minimum.

In the shaving unit according to the invention, it is practical if the hair-collecting chamber surrounds the first shielding member. The hair-collecting chamber may be present in an annular gutter-like portion of the base portion, and the first shielding member may be provided as an inner standing wall portion of the annular gutter-like portion. In this way, a compact and robust construction is obtained.

The invention covers any suitable option in respect of the mutually engaging configuration of the upper rim of the first shielding member and the lower rim of the second shielding member in the coupled condition of the hair-cutting unit and the base portion. According to a feasible option, seen in a longitudinal section of the shaving unit comprising the central axis, the upper rim of the first shielding member and the lower rim of the second shielding member are provided with matching step-like geometries that mutually engage in the coupled condition of the hair-cutting unit and the base portion. This option provides the desired sealing effect in robust and reliable fashion without involving complex constructional measures. It is advantageous if, seen in a circumferential direction about the central axis, the matching step-like geometries are present in both the upper rim of the first shielding member and the lower rim of the second shielding member over 360°, in other words, if, in the coupled condition of the hair-cutting unit and the base portion, the matching step-like geometries each extend annularly about the central axis.

In a practical embodiment of the shaving unit according to the invention:

the first shielding member comprises a first circular cylindrical wall portion and the second shielding member comprises a second circular cylindrical wall portion; and in the coupled condition of the hair-cutting unit and the base portion, the first circular cylindrical wall portion and the second circular cylindrical wall portion are each co-axially arranged relative to the central axis.

According to a further feasible option, in the shaving unit according to the invention:

the holder comprises a number of spoke-like connecting elements by means of which the holder is mounted to an inner side of the supporting member; and each of the spoke-like connecting elements extends radially relative to the central axis and directly connects to the inner side of the supporting member.

The fact is that in a conventional design, the holder comprises an inner rim and an outer rim connected to the inner rim by means of a number of intermediate portions, which may or may not be spoke-like. Thus, conventionally, the holder is mounted to the inner side of the supporting member by means of the outer rim. According to an insight of the invention, it is possible to omit the outer rim and still have a robust set-up of the hair-cutting unit. An important advantage of omitting the outer rim and having spoke-like connecting elements in the holder is that the size of passage openings in the holder for allowing cut hairs and other shaving debris, falling from the cutting interface of the external cutting member and the internal cutting member, to pass through the holder and subsequently be received in the hair-collecting chamber can be maximized. According to a practical option, the number of spoke-like connecting elements is three, and the three spoke-like connecting elements are arranged about the central axis at mutual angles of 120°, but other numbers and arrangements of the spoke-like elements may be useful as well. Further, it may be so that the spoke-like connecting elements are permanently connected to the inner side of the supporting member in a for the user non-releasable way, and that sufficient strength of the construction is guaranteed even though the conventional outer rim of the holder is missing.

When it comes to the design of the holder, it is further beneficial if:

- the internal cutting member comprises a carrier and a plurality of hair-cutting elements arranged annularly on the carrier;
- the hair-cutting elements extend, relative to the central axis, radially outward from a circumference of the carrier;
- the spoke-like connecting elements extend, relative to the central axis, radially outward from a central holding element of the holder; and
- seen in a direction of the central axis, the central holding element of the holder is confined within the circumference of the carrier of the internal cutting member.

Choosing the sizing of the central holding element of the holder relative to the sizing of the carrier of the internal cutting member so that the latter of the features mentioned here before is realized is another measure aimed at maximizing the size of passage openings in the holder for allowing cut hairs and other shaving debris, falling from the cutting interface of the external cutting member and the internal cutting member, to pass through the holder and subsequently be received in the hair-collecting chamber.

The invention further relates to an electric shaver comprising a main body and a shaving unit as defined and described here before, wherein:

- the main body accommodates an electric motor;
- the base portion of the shaving unit is connected to the main body; and
- the drive shaft of the base portion of the shaving unit is coupled to an output shaft of the electric motor.

The option according to which the holder comprises a number of spoke-like connecting elements and is connected directly to the inner side of the supporting member through said spoke-like connecting elements is applicable independently from the concept of integrally providing the base portion and the holder with respective shielding members for the purpose of sealing the opening in the bottom portion of the base portion relative to the hair-collecting chamber. In view thereof, in another aspect, the invention also relates to a shaving unit for a rotary electric shaver, comprising a base portion and a hair-cutting unit which is releasably coupled to the base portion, wherein:

- the hair-cutting unit comprises an external cutting member with hair-entry openings, an internal cutting member which is covered by and rotatable relative to the external cutting member about a central axis of the hair-cutting unit, a supporting member surrounding and supporting the external cutting member, and a holder mounted to the supporting member for keeping the external cutting member and the internal cutting member in an operational position in the supporting member;
- the base portion comprises a hair-collecting chamber which is accessible for a user of the shaving unit in a decoupled condition of the hair-cutting unit and the base portion;
- the holder comprises a number of spoke-like connecting elements by means of which the holder is mounted to an inner side of the supporting member; and
- each of the spoke-like connecting elements extends radially relative to the central axis and directly connects to the inner side of the supporting member.

It will be understood that the above-mentioned further options of the number of spoke-like connecting elements being three and the three spoke-like connecting elements being arranged about the central axis at mutual angles of 120°, the spoke-like connecting elements being permanently connected to the inner side of the supporting member in a for the user non-releasable way, and a central holding element of the holder being confined within the circumference of a carrier of the internal cutting member are equally applicable in this context.

The above-described and other aspects of the invention will be apparent from and elucidated with reference to the following detailed description of a shaving unit in which the base portion is integrally provided with a first shielding member and the holder is integrally provided with a second shielding member, and in which the hair-collecting chamber of the base portion is closed at an inner side thereof on the basis of mutual engagement of an upper rim of the first shielding member and a lower rim of the second shielding member.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
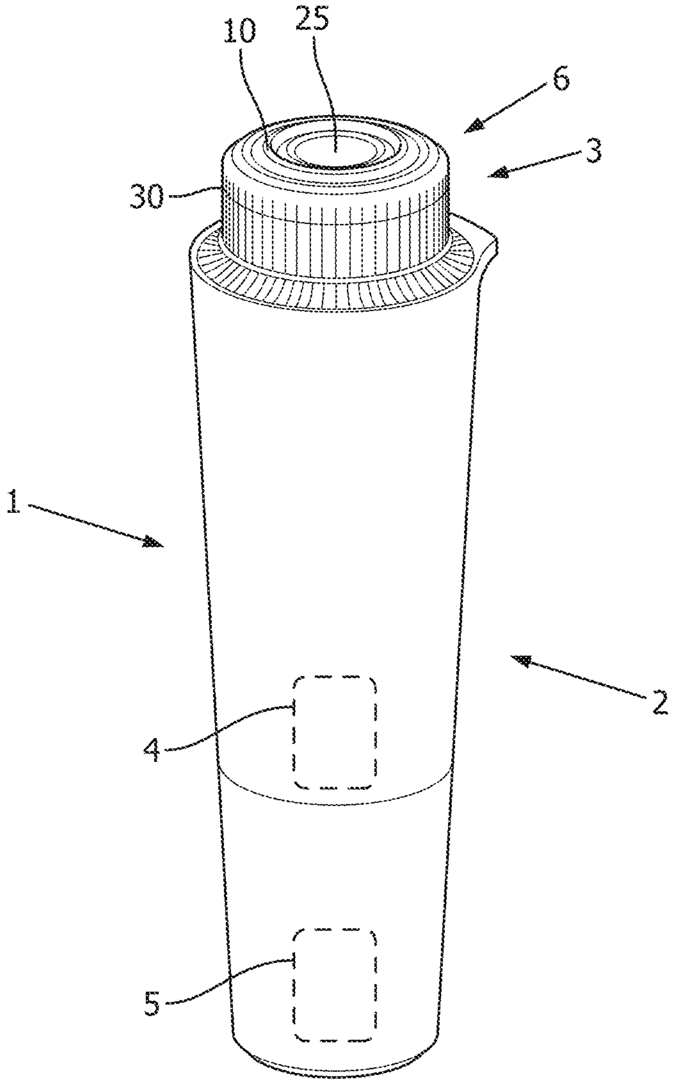
FIG. 1 diagrammatically shows a perspective view of an embodiment of an electric shaver according to the invention, which electric shaver comprises a shaving unit and a main body.

FIG. 1 shows an electric shaver of the rotary type, which is suitable to be used for removing facial hair, as an embodiment of an electric shaver 1 according to the invention. The electric shaver 1 comprises a main body 2 and a shaving unit 3, wherein the main body 2 is designed to enable a user of the electric shaver 1 to take hold of the electric shaver 1 and to handle the electric shaver 1, and wherein the shaving unit 3 is the part of the electric shaver 1 that is to be positioned on and moved over the skin for hair removal. When the electric shaver 1 is actually applied for the purpose of performing a shaving action, the actual process of cutting off hairs protruding from the skin takes place at the position of the shaving unit 3. The main body 2 accommodates an electric motor for generating motion used to drive components of the shaving unit 3. Another feasible example of a component as may be located in an interior space of the main body 2 is a battery for powering the electric motor. In FIG. 1, both the electric motor and the battery are depicted in dashed lining, wherein the electric motor is indicated by means of reference numeral 4, and the battery is indicated by means of reference numeral 5.

The shaving unit 3 comprises a hair-cutting unit 6, and the hair-cutting unit 6 comprises a combination of an external cutting member 10 and an internal cutting member 20, as will now be described in more detail with reference to FIG. 2. The external cutting member 10 is of a generally cup-shaped design and is thereby suitable for at least partially accommodating the internal cutting member 20 in its interior. At an exterior side thereof, the external cutting member 10 has a shaving surface 11 configured to face the skin to be subjected to a shaving action. Further, an annular hair-cutting track 12 is present in the external cutting member 10, which hair-cutting track 12 comprises lamellae 13 extending along the width of the hair-cutting track 12, in a substantially radial direction relative to a central axis $A_c$ of the hair-cutting unit 6, which coincides with both a central axis of the external cutting member 10 and a rotational axis about which the internal cutting member 20 is rotatable relative to the external cutting member 10. Apertures as present between the lamellae 13 constitute hair-entry openings 14 of the hair-cutting track 12. Sides of the lamellae 13 constitute hair-cutting surfaces 15 suitable for cutting off hairs in cooperation with hair-cutting edges 21 of hair-cutting elements 22 of the internal cutting member 20. The invention also relates to cases in which the hair-cutting track 12 does not comprise lamellae 13 or does not only comprise lamellae 13, such as cases in which the entire hair-cutting track 12 is provided with teeth-like elements and/or a pattern of (circular) holes instead of or in addition to lamellae 13. Also, the invention relates to cases in which more than one hair-cutting track 12 is present in the external cutting member 10.

A hair-cutting action can be performed when the internal cutting member 20 is activated to rotate and a portion of skin is actually contacted by the external cutting member 10 at the position of the hair-cutting track 12. Activation of the internal cutting member 20 may take place in a known manner by means of a drive component such as a drive shaft, acting on a carrier 23 of the internal cutting member from which the hair-cutting elements 22 extend. When the combination of the external cutting member and the internal cutting member 20 is moved over the portion of skin while the internal cutting member 20 is driven to rotate, it is achieved that hairs protruding from the portion of skin are caught in the hair-entry openings 14 of the hair-cutting track 12 of the external cutting member 10 and are cut off in that position as result of a cooperation between the hair-cutting surfaces 15 of the hair-cutting track 12 of the external cutting member 10 and the hair-cutting edges 21 of the hair-cutting elements 22 of the rotating internal cutting member 20.

Besides the hair-cutting track 12, the external cutting member 10 includes a central portion 16 comprising a central bearing portion which is designed to be used in rotationally supporting the internal cutting member 20 in the hair-cutting unit 6. The central portion 16 of the external cutting member 10 also serves for supporting a decorative cap 25 configured to cover part of the exterior surface of the external cutting member 10. In the shown example, the central portion 16 comprises a centrally located recess, and the cap 25 comprises a projection which is accommodated in the recess.

Figure 2:
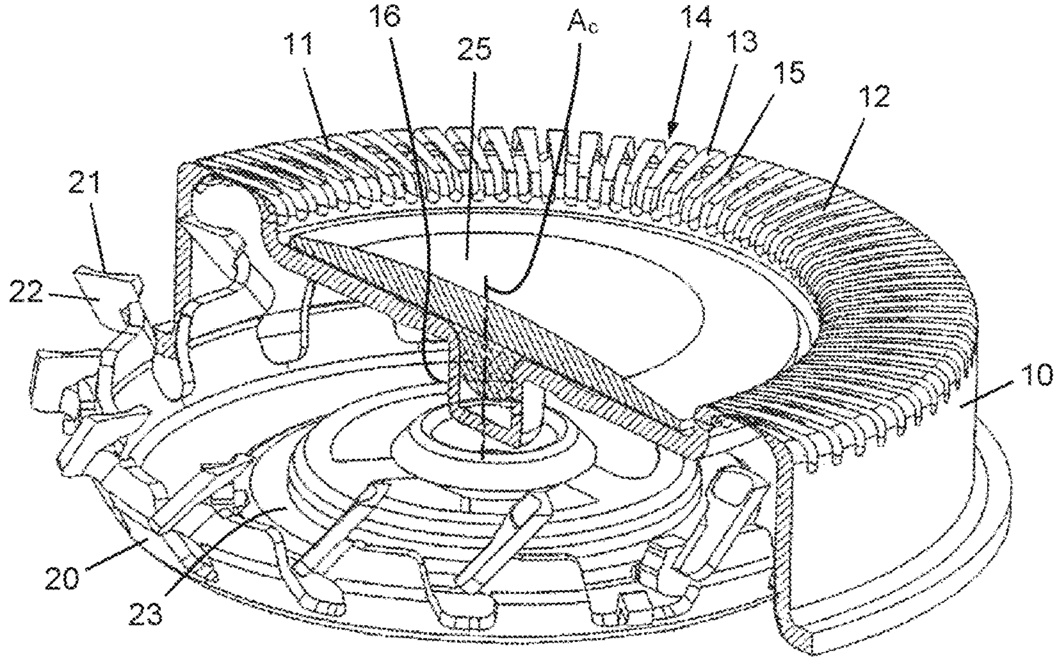
FIG. 2 diagrammatically shows a perspective view of an external cutting member, a decorative cap and an internal cutting member of a hair-cutting unit of a conventional shaving unit, wherein both the external cutting member and the cap are shown with a portion cut away.

As indicated earlier, FIG. 2 shows an external cutting member 10, a decorative cap 25 and an internal cutting member 20 of a hair-cutting unit 6 of a conventional shaving unit, but that does not alter the fact that the explanation provided in the foregoing on the basis of FIG. 2 is equally applicable to a shaving unit 3 according to the invention.

Figure 3:
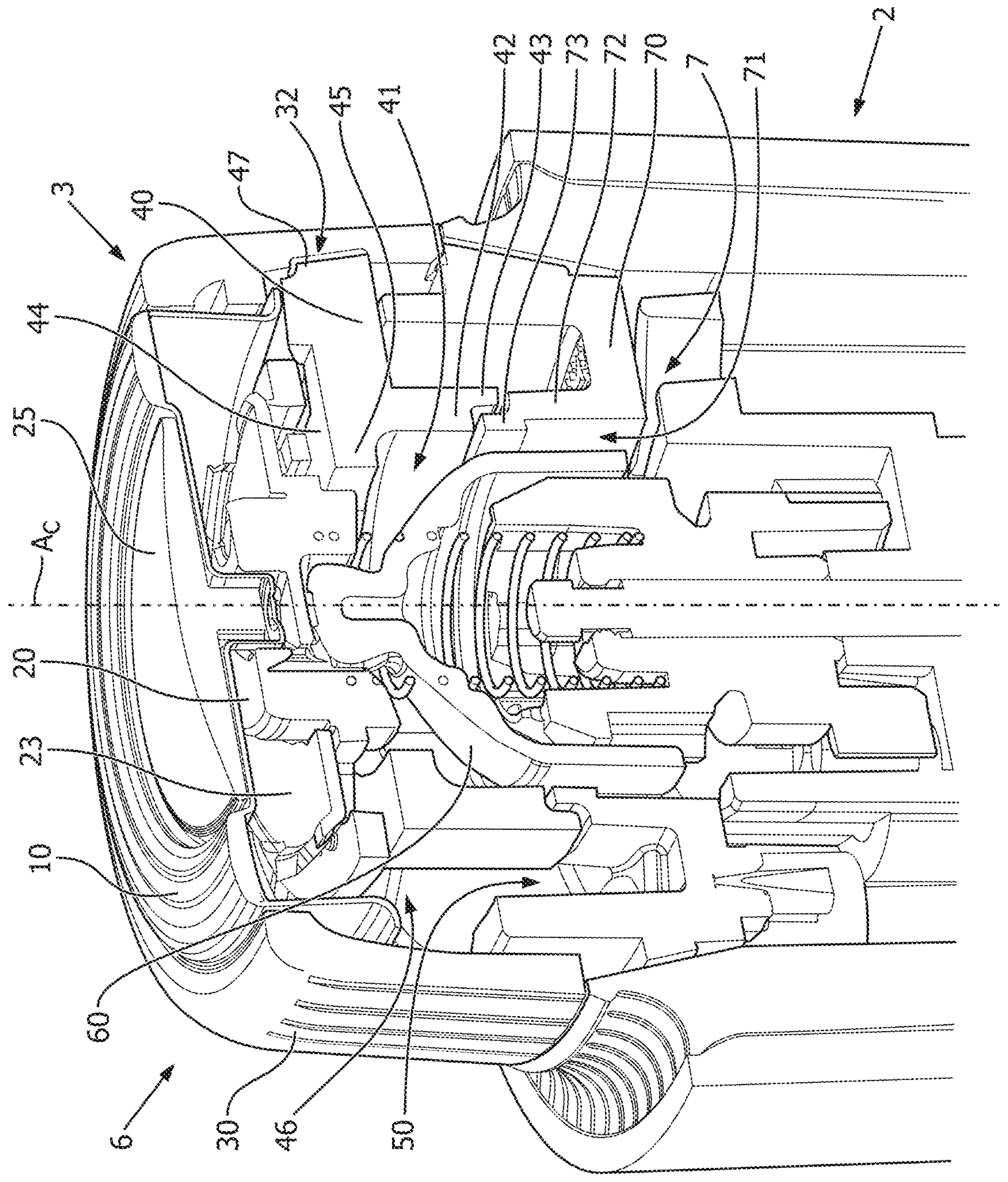
FIG. 3 diagrammatically shows a longitudinal sectional view of an embodiment of a shaving unit according to the invention.

FIG. 3 shows an embodiment of a shaving unit 3 according to the invention. A longitudinal sectional view of the shaving unit 3 is provided so that the interior structure can be seen. It is noted that the external cutting member 10 is depicted in partially simplified fashion in FIG. 3, wherein particularly the hair-entry openings 14 are not shown.

It can be seen in FIG. 3 that besides the external cutting member 10 and the internal cutting member 20, the hair-cutting unit 6 of the shaving unit 3 comprises a supporting member 30 surrounding and supporting the external cutting member 10 and a holder 40 mounted to the supporting member 30 for keeping the external cutting member 10 and the internal cutting member 20 in an operational position in the supporting member 30. Further, it can be seen in FIG. 3 that besides the hair-cutting unit 6, the shaving unit 3 comprises a base portion 7. The base portion 7 comprises a hair-collecting chamber 50 for receiving and storing cut hairs and other shaving debris, falling from the cutting interface of the external cutting member 10 and the internal cutting member 20 during a shaving action. The base portion 7 further comprises a drive shaft 60 for driving the internal cutting member 20 into rotation about the central axis $A_c$ during a shaving action, which drive shaft 60 extends through an opening 71 in a bottom portion 70 of the base portion 7.

Figure 5:
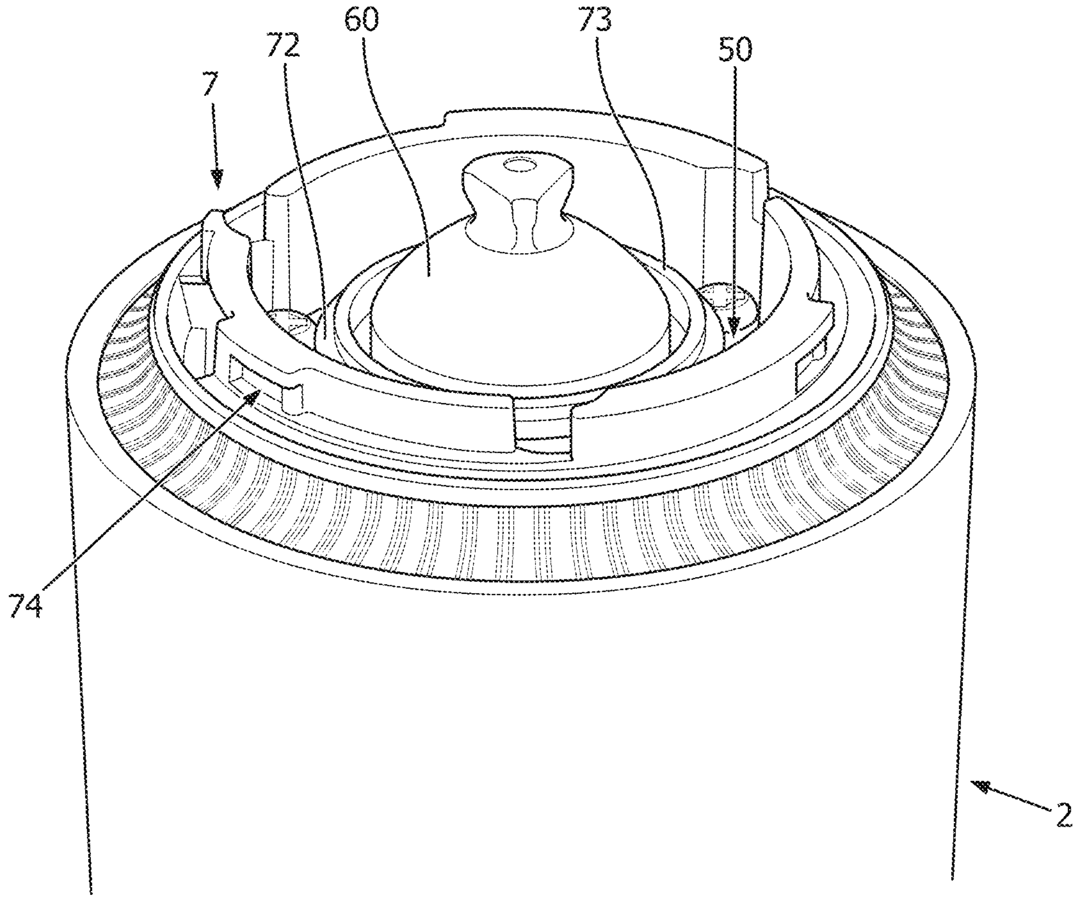
FIGS. 5 and 6 illustrate the option of a bayonet connection between the hair-cutting unit and a base portion of the embodiment of a shaving unit according to the invention.
Figure 6:
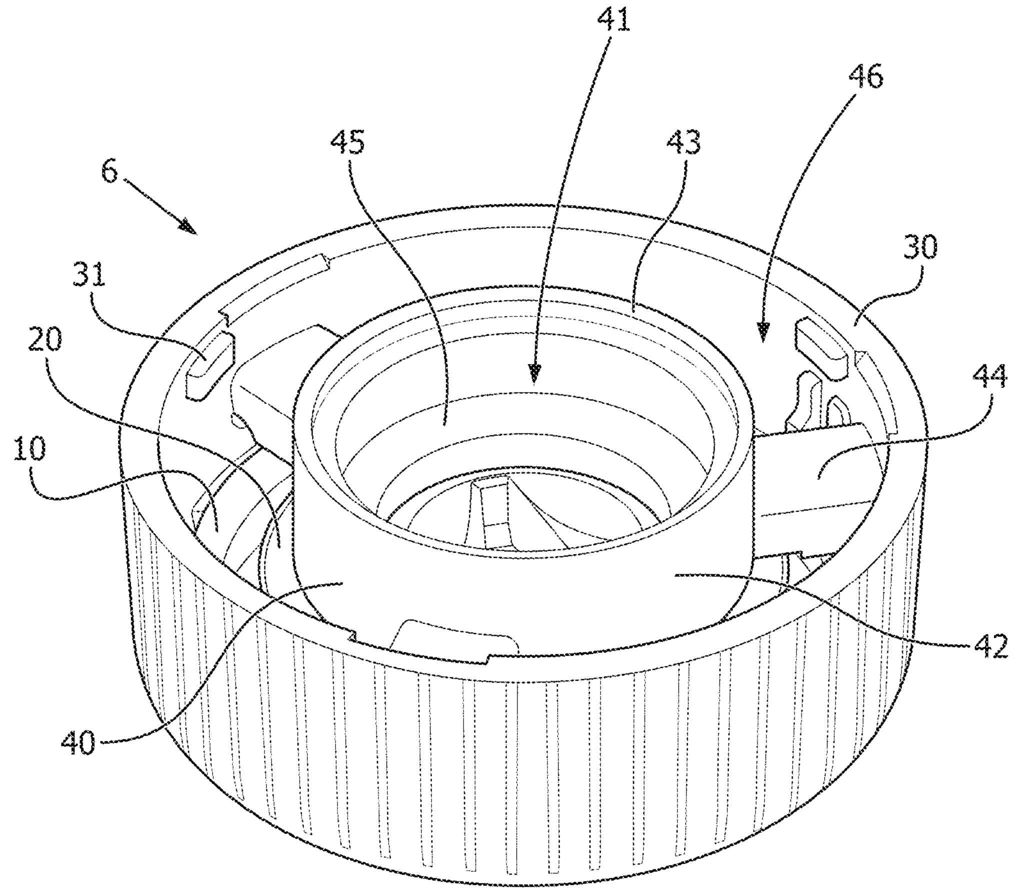

In the electric shaver 1, the drive shaft 60 is coupled to an output shaft of the electric motor 4. Further, in the electric shaver 1, the base portion 7 is connected to the main body 2. The hair-cutting unit 6 is releasably coupled to the base portion 7, such as through a bayonet connection as illustrated by means of FIGS. 5 and 6, wherein a recessed-type element of the base portion 7 involved in the bayonet connection is indicated by means of reference numeral 74 in FIG. 5, and wherein a block-type element of the hair-cutting unit 6 involved in the bayonet connection, which is located at the interior surface of the supporting member 30, is indicated by means of reference numeral 31 in FIG. 6. In a coupled condition of the hair-cutting unit 6 and the base portion 7, the drive shaft 60 extends through an opening 41 in the holder 40 and engages the internal cutting member 20, and in a decoupled condition of the hair-cutting unit 6 and the base portion 7, the hair-collecting chamber 50 is accessible for the user.

The base portion 7 comprises an annular collar 72 that is integrally formed with the bottom portion 70 of the base portion 7 and surrounds the opening 71 in the bottom portion 70 of the base portion 7, while the hair-collecting chamber 50 surrounds the annular collar 72. The holder 40 comprises an annular wall 42 that is integrally formed with the holder 40 and surrounds the opening 41 in the holder 40. The annular collar 72 of the base portion 7 is referred to as first shielding member 72, and the annular wall 42 of the holder 40 is referred to as second shielding member 42. In the present example, the first shielding member 72 and the second shielding member 42 are each co-axially arranged relative to the central axis $A_c$ of the hair-cutting unit 6. Further, an upper rim 73 of the first shielding member 72 and a lower rim 43 of the second shielding member 42 are provided with matching geometries, which are step-like geometries in the present example, and which each extend annularly about the central axis $A_c$.

The first shielding member 72 is integrally formed with the base portion 7 and the second shielding member 42 is integrally formed with the holder 40. This can be achieved by manufacturing the base portion 7 and the holder 40 from an injection-moldable material, in particular a plastic material, and by forming the first shielding member 72 and the second shielding member 42 as an integral portion of, respectively, the base portion 7 and the holder 40 during the injection molding manufacturing process of the base portion 7 and the holder 40.

As can be seen in FIG. 3, in the coupled condition of the hair-cutting unit 6 and the base portion 7, the matching geometries of the first shielding member 72 and the second shielding member 42 engage, wherein the combination of the first shielding member 72 and the second shielding member 42 forms a continuous annular sleeve that separates the drive shaft 60 from the hair-collecting chamber 50. Thus, the base portion 7 and the holder 40 are combined in such a way that a functionality of sealing the opening 71 in the bottom portion 70 of the base portion 7 relative to the hair-collecting chamber 50 is obtained, so that a disadvantageous situation, in which a path is present in the shaving unit 3 along which cut hairs and other shaving debris can move from the hair-collecting chamber 50 to the opening 71 in the bottom portion 70 of the base portion 7 and can eventually reach the interior space of the main body 2 from there, cannot occur.

Figure 4:
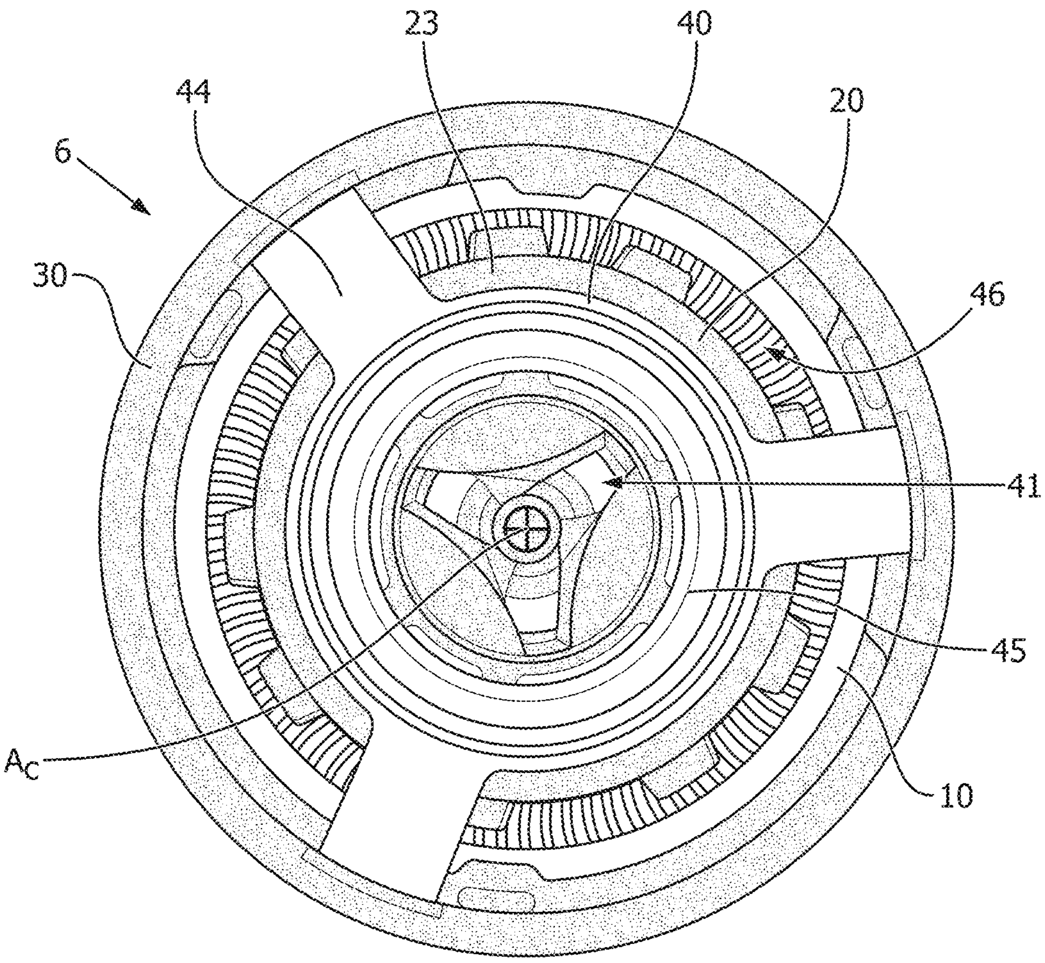
FIG. 4 diagrammatically shows a view on the hair-cutting unit of the embodiment of a shaving unit according to the invention, in a direction from a holder towards the internal cutting member and the external cutting member.

FIG. 4 shows the hair-cutting unit 6 as decoupled from the base portion 7, wherein a direction of view is a direction from the holder 40 towards the internal cutting member 20 and the external cutting member 10. Among other things, it can be seen in the figure that, in the present example, the holder 40 comprises three spoke-like connecting elements 44 extending radially outward from a central holding element 45, and is connected to an inner side of the supporting member 30 by means of said spoke-like connecting elements 44. In this way, the passage of cut hairs and other shaving debris from the cutting interface of the external cutting member 10 and the internal cutting member 20 is optimized, as using the spoke-like connecting elements 44 is an effective and practical way of having passage openings 46 in the holder 40 which are as large as possible without compromising important factors such as constructional strength and stability of the holder 40 in the radial direction relative to the central axis $A_c$. In said radial direction relative to the central axis $A_c$, the passage openings 46 are positioned and sized such that, in the coupled condition of the hair-cutting unit 6 and the base portion 7, the passage openings 46 in the holder 40 are aligned with the hair-collecting chamber 50. By hindering passage from cut hairs and other shaving debris to the hair-collecting chamber 50 to a minimum extent only, it is achieved that a known disadvantageous effect of formation of so-called bird's nests of cut hairs and other shaving debris as a result of tumbling is avoided. According to an insight of the invention, small slotted or segmented passage openings 46 in the holder 40 will increase the risk of clogging the path from cutting interface to hair-collecting chamber 50, wherein said risk is especially high with shaving debris that is longer than stubbles.

The spoke-like connecting elements 44 may be connected in a non-releasable way to the inner side of the supporting member 30. In the present example, this is realized by a non-releasable click connection of an end portion 47 of each of the connecting elements 44 in a recess 32 provided in the inner side of the supporting member 30, as is visible in FIG. 3 for one of the connecting elements 44. In the context of the invention, the number of the spoke-like connecting elements 44 does not necessarily need to be three. It is advantageous if the spoke-like connecting elements 44 are arranged about the central axis $A_c$ at similar mutual angles, but also this is not essential. FIG. 4 further illustrates the fact that it is advantageous if, seen in the direction of the central axis $A_c$, the central holding element 45 of the holder is within the footprint of the carrier 23 of the internal cutting member 20, because in that case, the only obstruction in passage for cut hairs and other shaving debris to the hair-collecting chamber 50 is constituted by the spoke-like connecting elements 44.

On the basis of the present design of the holder 40, it is achieved that the extent to which the hair passage from cutting interface to hair-collecting chamber 50 is blocked as a result of the presence of the holder 40 can be as low as 20%, so that compared to a situation of using a holder 40 of conventional design, small hairs will have less chance to tumble and form bird's nests or other forms of debris congestion. All in all, the shaving unit 3 of the present embodiment is effectively designed to be functional to cut off hairs in a shaving action and collect the hairs in a hair-collecting chamber 50, wherein passage from cut hairs and other shaving debris to the hair-collecting chamber 50 is hindered by the presence of the holder 40 to a minimum extent only, and wherein passage from cut hairs and other shaving debris from the hair-collecting chamber 50 to the opening 71 in the bottom portion 70 of the base portion 7 through which the drive shaft 60 extends is prevented. The measures aimed at achieving the minimum hindrance to passage to the hair-collecting chamber 50 and the measures aimed at achieving the prevention of passage to the opening 71 in the bottom portion 70 of the base portion 7 are not intrinsically linked and can be applied independently.

It will be clear to a person skilled in the art that the scope of the invention is not limited to the examples discussed in the foregoing, and that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

In the embodiment shown in FIGS. 1, 3 and 4 and described in the foregoing, the shaving unit 3 according to the invention comprises a single hair-cutting unit 6. That does not alter the fact that the invention also covers embodiments of the shaving unit 3 in which two or more hair-cutting units 6 are located. In a case in which the shaving unit 3 includes at least two hair-cutting units 6, it may be practical if the hair-cutting units 6 are positioned on a shared base portion 7, although it is also possible that each hair-cutting unit 6 is positioned on a base portion 7 assigned to the respective hair-cutting unit 6. In the first case, the base portion 7 may be shaped such that either a shared hair-collecting chamber 50 is present in the shaving unit 3 for receiving and storing cut hairs and other shaving debris of all of the hair-cutting unit 6, or separate hair-collecting chambers 50 are present in the shaving unit 3, wherein each of the hair-collecting chambers 50 is assigned to a respective hair-cutting unit 6.

Notable aspects of the invention are summarized as follows. In a hair-cutting unit 6 of a shaving unit 3, a supporting member 30 surrounding and supporting an external cutting member 10 is present, and further a holder 40 mounted to the supporting member 30 for keeping the external cutting member 10 and the internal cutting member 20 in an operational position in the supporting member 30 is present. A base portion 7 of the shaving unit 3 comprises a hair-collecting chamber 50, a drive shaft 60 extending through an opening 71 in a bottom portion 70 of the base portion 7, and a first shielding member 72 surrounding the opening 71 in the bottom portion 70 of the base portion 7. The holder 40 comprises a second shielding member 42 surrounding an opening 41 in the holder 40, wherein, in a coupled condition of the hair-cutting unit 6 and the base portion 7, an upper rim 73 of the first shielding member 72 and a lower rim 43 of the second shielding member 42 mutually engage such that the first shielding member 72 and the second shielding member 42 together surround the drive shaft 60 and thereby seal the opening 71 in the bottom portion 70 of the base portion 7 relative to the hair-collecting chamber 50.

The invention claimed is:

1. A shaving unit for a rotary electric shaver, the shaving unit comprising a base portion and a hair-cutting unit, wherein the hair-cutting unit is releasably coupled to the base portion, wherein:

the hair-cutting unit comprises an external cutting member with hair-entry openings, an internal cutting member having a plurality of blades which is covered by and rotatable relative to the external cutting member about a central axis of the hair-cutting unit, a supporting member surrounding and supporting the external cutting member, and a holder mounted to the supporting member for keeping the external cutting member and the internal cutting member in an operational position in the supporting member;

the base portion comprises a hair-collecting chamber and a drive shaft, the drive shaft extending through an opening in a bottom portion of the base portion;

in a coupled condition of the hair-cutting unit and the base portion, the drive shaft extends through an opening in the holder and engages the internal cutting member for driving the internal cutting member into rotation about the central axis;

in a decoupled condition of the hair-cutting unit and the base portion, the hair-collecting chamber is accessible for a user of the shaving unit;

the base portion comprises a first shielding member integrally formed with the bottom portion of the base portion and surrounding the opening in the bottom portion of the base portion;

the holder comprises a second shielding member integrally formed with the holder and surrounding the opening in the holder; and in the coupled condition of the hair-cutting unit and the base portion, an upper rim of the first shielding member and a lower rim of the second shielding member mutually engage such that the first shielding member and the second shielding member together surround the drive shaft and thereby seal the opening in the bottom portion of the base portion relative to the hair-collecting chamber.

2. The shaving unit as claimed in claim 1, wherein the hair-collecting chamber surrounds the first shielding member.

3. The shaving unit as claimed in claim 1, wherein, seen in a longitudinal section of the shaving unit comprising the central axis, the upper rim of the first shielding member and the lower rim of the second shielding member are provided with matching step geometries that mutually engage in the coupled condition of the hair-cutting unit and the base portion.

4. The shaving unit as claimed in claim 3, wherein, in the coupled condition of the hair-cutting unit and the base portion, the matching step geometries each extend annularly about the central axis.

5. The shaving unit as claimed in claim 1, wherein:

the first shielding member comprises a first circular cylindrical wall portion and the second shielding member comprises a second circular cylindrical wall portion; and in the coupled condition of the hair-cutting unit and the base portion, the first circular cylindrical wall portion and the second circular cylindrical wall portion are each co-axially arranged relative to the central axis.

6. The shaving unit as claimed in claim 1, wherein:

the holder comprises a number of spoke connecting elements by means of which the holder is mounted to an inner side of the supporting member; and each of the spoke connecting elements extends radially relative to the central axis and directly connects to the inner side of the supporting member.

7. The shaving unit as claimed in claim 6, wherein the number of spoke connecting elements is three, and wherein the three spoke connecting elements are arranged about the central axis at mutual angles of 120°.

8. The shaving unit as claimed in claim 6, wherein the spoke connecting elements are permanently connected to the inner side of the supporting member in a for the user non-releasable way.

9. The shaving unit as claimed in claim 6, wherein:

the internal cutting member comprises a carrier and the plurality of blades are arranged annularly on the carrier;

the blades extend, relative to the central axis, radially outward from a circumference of the carrier;

the spoke connecting elements extend, relative to the central axis, radially outward from a central holding element of the holder; and seen in a direction of the central axis, the central holding element of the holder is confined within the circumference of the carrier of the internal cutting member.

10. An electric shaver comprising a main body and the shaving unit as claimed in claim 1, wherein:

the main body accommodates an electric motor;

the base portion of the shaving unit is connected to the main body; and the drive shaft of the base portion of the shaving unit is coupled to an output shaft of the electric motor.

* * * * *